United States Patent
Pan et al.

(10) Patent No.: US 7,809,552 B2
(45) Date of Patent: *Oct. 5, 2010

(54) INSTANCE-BASED SENTENCE BOUNDARY DETERMINATION BY OPTIMIZATION

(75) Inventors: Shimai Pan, Armonk, NY (US); James Shaw, Tenafly, NJ (US)

(73) Assignee: International Business Machines Corporation, Armonk, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/051,973

(22) Filed: Mar. 20, 2008

(65) Prior Publication Data

US 2008/0167857 A1 Jul. 10, 2008

Related U.S. Application Data

(63) Continuation of application No. 11/415,196, filed on May 2, 2006, now Pat. No. 7,552,047.

(51) Int. Cl.
G06F 17/27 (2006.01)
G06F 17/26 (2006.01)
G10L 21/00 (2006.01)

(52) U.S. Cl. .............. 704/9; 704/257; 704/270
(58) Field of Classification Search ........... 704/1–9
See application file for complete search history.

(56) References Cited

U.S. PATENT DOCUMENTS

| | | | | |
|---|---|---|---|---|
| 6,393,388 | B1 * | 5/2002 | Franz et al. ............. | 704/4 |
| 7,231,341 | B2 * | 6/2007 | Bangalore et al. ........ | 704/1 |
| 2003/0055626 | A1 * | 3/2003 | Miyahira et al. ......... | 704/9 |
| 2003/0130837 | A1 * | 7/2003 | Batchilo et al. ......... | 704/9 |
| 2003/0212545 | A1 * | 11/2003 | Kallulli ................ | 704/9 |
| 2004/0034520 | A1 * | 2/2004 | Langkilde-Geary et al. | 704/1 |
| 2004/0193401 | A1 * | 9/2004 | Ringger et al. .......... | 704/9 |
| 2004/0243394 | A1 * | 12/2004 | Kitamura ............... | 704/9 |

OTHER PUBLICATIONS

Stephen Boyd et al. "Branch and Bound Methods", Lecture Notes for EE3920, Stanford University, Nov. 1, 2003.*
Mann et al. "Computer generation of multiparagraph English text", American Journal of Computational Linguistics, 1981.*
Pan et al. "Designing a speech corpus for instance-based spoken language generation", Proc. ICNLG, 2002.*
Manurung, "An evolutionary algorithm approach to poetry generation", PhD thesis, University of Edinburgh, 2003.*
Varges et al. "Instance-based natural langauge generation", Proc. NAACL, 2001.*

(Continued)

*Primary Examiner*—Richemond Dorvil
*Assistant Examiner*—Jialong He
(74) *Attorney, Agent, or Firm*—Whitham, Curtis, Christofferson & Cook, P.C; Stephen C. Kaufman

(57) ABSTRACT

A method for instance-based sentence boundary determination optimizes a set of criteria based on examples in a corpus, and provides a general domain-independent framework for the task by balancing a comprehensive set of sentence complexity and quality constraints. The characteristics and style of naturally occurring sentences are simulated through the use of semantic grouping and sentence length distribution. The method is parameterized so that it is easily adapts to suit a Natural Language Generation (NLG) system's generation.

17 Claims, 2 Drawing Sheets

OTHER PUBLICATIONS

Reiter et al. "Building applied natural language generation systems", Natural Language Engineering, 1995.*

Pan et al. "SEGUE: A hybrid case-based surface natural language generator", Proc. of ICNLG, 2004.*

Pan et al. "Instance-based sentence boundary determination by optimization for natural language generation", Proc. on ACL, pp. 565-572, Jun. 25, 2005.*

* cited by examiner

US 7,809,552 B2

INSTANCE-BASED SENTENCE BOUNDARY DETERMINATION BY OPTIMIZATION

CROSS REFERENCE TO RELATED APPLICATION

This application is a continuation of application Ser. No. 11/415,196 filed May 2, 2006, now U.S. Pat. No. 7,552,047 issued Jun. 23, 2009.

BACKGROUND OF THE INVENTION

1. Field of the Invention

The present invention generally relates to an instance-based sentence boundary determination method and, more particularly, to a method for the generation of sentences which are optimized by a set of criteria based on examples in a corpus.

2. Background Description

The problem of sentence boundary determination in natural language generation exists when more than one sentence is needed to convey multiple concepts and relations. In the classic natural language generation (NLG) architecture, sentence boundary decisions are made during the sentence planning stage in which the syntactic structure and wording of sentences are decided. Sentence boundary determination is a complex process that directly impacts a sentence's readability, its semantic cohesion, its syntactic and lexical realizability, and its smoothness between sentence transitions. Sentences that are too complex are hard to understand, so are sentences lacking semantic cohesion and cross-sentence coherence. Furthermore, bad sentence boundary decisions may even make sentences unreadable.

Existing approaches to sentence boundary determination typically employ one of the following strategies. The first strategy uses domain-specific heuristics to decide which propositions can be combined. For example, *Proteus* produces game descriptions by employing domain specific sentence scope heuristics. This approach can work well for a particular application; however, it is not readily reusable for new applications. The second strategy is to employ syntactic, lexical, and sentence complexity constraints to control the aggregation of multiple propositions. These strategies can generate fluent complex sentences, but they do not take other criteria into consideration, such as semantic cohesion. Furthermore, since these approaches do not employ global optimization, the content of each sentence might not be distributed evenly. This may cause a dangling sentence problem, for example.

SUMMARY OF THE INVENTION

It is therefore an exemplary embodiment of the present invention to provide a general and flexible sentence boundary determination framework which takes a comprehensive set of sentence complexity and quality related criteria and automatically generates sentences that optimize these criteria.

A further exemplary embodiment of the invention takes into consideration and is sensitive to not only the complexity of the generated sentences, but also their semantic cohesion, multi-sentence coherence and syntactic and lexical realizability.

It is another exemplary embodiment of the present invention to provide a computer-implemented method that employs an instance-based method that is sensitive to the style of the sentences in the application domain in which the corpus is collected.

It is still another exemplary embodiment of the present invention to provide a computer-implemented method that can be adjusted easily to suit a sentence generation system's capability and avoid some of its known weaknesses.

According to the invention, there is provided a sentence boundary determination framework that is executable within a multimodal conversation application. An example of a particular multimodal conversation application is in the real-estate domain in which potential home buyers interact with the system using multiple modalities, such as speech and gesture, to request residential real-estate information. After interpreting the request, the system formulates a multimedia presentation, including automatically generated speech and graphics, as the response. The sentence boundary determination method executing within the application takes a set of propositions selected by a content planner and passes the sentence boundary decisions to an instance-based sentence generator, to formulate the final sentences.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
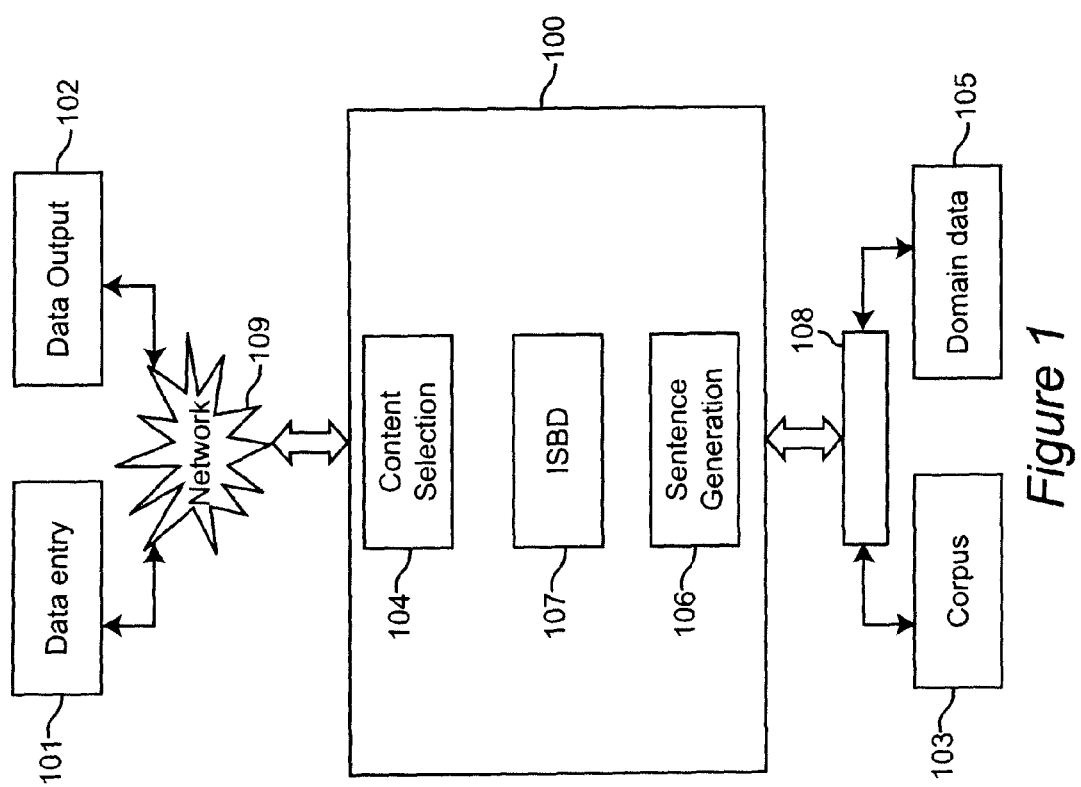
FIG. 1 is a system diagram which shows where the instance-based Sentence boundary determination (ISBD) method would be implemented.

Referring now to FIG. 1, the instance-based sentence boundary determination by optimization method (ISBD) is implemented within the capabilities of computing resources. The method is shown as a module 107 within a domain 100. The domain can be any one of a multitude of environments that accept requests for information and return the information in a sentence format. The domain example used throughout this description is that of the real estate domain. In the real estate domain, a user can query a system for information regarding specific houses, towns or schools. As the response to the user's query, the content selection application 104 returns the content, represented as a set of propositions, to be conveyed. The ISBD 107 would consult the domain corpus 103 to optimize the content of each sentence to be returned as the response to the query. Optimization is defined as a solution that is most similar to the examples in the corpus 103; consequently it can avoid dangling sentences, incoherent sentences, and/or semantic group splitting. Given the content of one or more sentences determined by ISBD 107, the sentence generation application 106 would return a description of the requested houses, towns or schools in one or more grammatical sentences. The domain 100 is typically implemented within a central processing unit. It interfaces with external data entry 101 and data output 102 elements through a network 109. The network 109 may be any one of several types of connectivity to include but not be limited to a local area network, a wide area network such as, but not limited to, connectivity through the Internet. Process steps may be performed based on computer readable program code stored on a computer readable medium.

The data entry 101 element may include but not be limited to a keyboard, a voice recognition device, mouse, a touch sensitive screen, or other such devices. The data output 102 element may include but not be limited to computer screen, printer, video display, monitor, or other such device. Likewise, the system for performing the method, software or firmware containing the instruction set for performing the method can be processed within a central processing unit or other computer resource. The ISBD 107 optimizes the solution based on examples in a corpus 103 which is stored either within the domain 100 or, as shown in FIG. 1, in a separate storage medium and/or database. The corpus 103 is accessed through a communication link 108. The communication link 108 may be a local area or wide area network such as network 109. The communication link 108 may also be a direct connection such as a bus internal to the domain 100. By accessing the corpus 103 to optimize the solution, the ISBD 107 output sentences (or solution) can demonstrate properties, such as comparable sentence length distribution and semantic grouping similar to those in the corpus. The ISBD 107 also avoids problematic sentence boundaries by optimizing the solutions using all the instances in the corpus.

The domain data 105 are accessed through communication link 108 and may also be stored either within the domain 100 or, as shown in FIG. 1, in a separate storage medium and/or database. One example of the domain data used in the real restate application is the MLS database that contains descriptions of thousands of houses.

For the real estate domain example, a user would request details about a particular house by entering request information through the data entry 101 element. The content selection element 104 will decide all the content to be conveyed as the system's response to the request. Given those content, the ISBD 107 would examine the example sentences from the corpus 103 and decide the number of sentences to be used in the response and the content of each sentence. Given the content of each sentence, the sentence generation application 106 will produce one grammatical sentence. In the end, one or more sentences are produced based on the solutions of ISBD 107. Once the best sentence or set of sentences is produced, the domain 100 would provide the solution to the user through the data output 102 element.

The variables that are used by the invention to calculate the various costs and weights for optimizing the solution relative to the particular query from the user are shown in Table 1

TABLE 1

Instance-based Sentence Boundary Determination Variables

| | |
|---|---|
| P | is the set of propositions to be conveyed |
| SBC | is the sentence boundary cost; there is an SBC whenever there is a sentence break |
| $C_i$ | is a single instance/example within the corpus |
| $P_j$ | is a proposition in P. |
| $C_{Hj}$ | is the host sentence in the corpus which contains the proposition $p_j$. |
| icost | is the insertion cost |
| dcost | is the deletion cost |
| $W_i$ | is the insertion weight |
| $W_d$ | is the deletion weight |
| $N_b$ | is the number of sentences in the solution |
| D | contains propositions in $C_i$ that do not exist in P |
| I | contains propositions in P that are not in $C_i$ |
| O | contains propositions in $C_i$ that exist in P |
| $E_j$ | any subset of I including Ø and I |
| Q | Contains propositions in I but not in Ej |
| Cost (Q) | is the cost of sbd(Q) |

Figure 2:
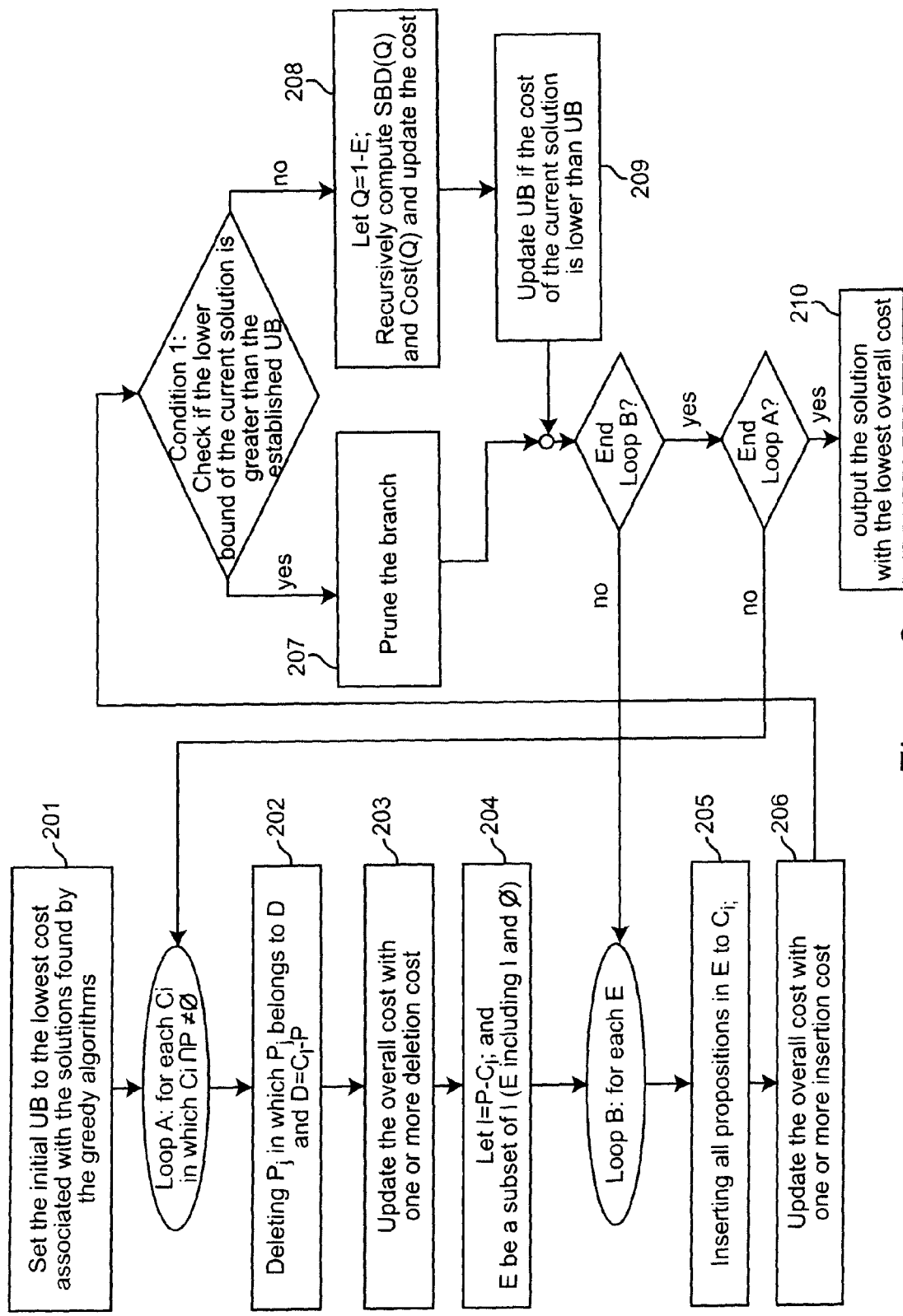
FIG. 2 is a flowchart that illustrates the optimization using example corpus and the overall cost function.

Referring now to the drawings, and more particularly to FIG. 2, there is shown the details of the sentence boundary determination algorithm, sbd(P), where P is the set of input propositions. Given an input, P, for each corpus instance $C_i$, a search branch is constructed representing all possible ways to realize the input using the instance plus deletions, insertions and sentence breaks. Since each sentence break triggers a recursive call to the sentence boundary determination algorithm, the complexity of the algorithm is NP-hard. To speed up the process, in each iteration, unproductive branches are eliminated (pruned) using an upper bound derived by several greedy algorithms.

Step 201 sets the current upper bound, UB, to the minimum cost of solutions derived by any one of three greedy algorithms.

The first type of greedy algorithm that can be used to set the UB for input P is a greedy set partition algorithm in which the corpus instance C associated with the set $\{S|S \subset P\}$ with the largest |S| is selected first. This process is repeated for each P' where P'=P−S. The solution cost is calculated using the relationship: $\text{Cost}(P)=(N_b-1)*SBC$, Another type of greedy algorithm that will calculate the initial UB is a greedy minimum set covering algorithm. This algorithm can be employed when the corpus instance C associated with the set S that maximizes the overlapping of propositions in P is found. The unwanted propositions in C are deleted. Assume P'=P−S, the delete process is performed for all P' until P' is empty. The solution cost is again calculated using the relationship:

$$\text{Cost}(P)=(N_b-1)*SBC+\Sigma_{i<b}\Sigma_{j\in D}d\text{cost}(C_i,P_j).$$

The only difference between this and the previous approach is that S here might not be a subset of P.

A third type of greedy algorithm that will calculate the UB looks at a maximum overlapping sentence. First, this greedy algorithm identifies the instance $C_i$ in the corpus that covers the maximum number of propositions in P. To arrive at a solution for P, the rest of the propositions not covered by Ci are inserted into Ci and all the unwanted propositions in Ci are deleted. The cost of this solution is:

$$W_d*\Sigma_{p_j\in D}d\text{cost}(Ci,p_j)+W_i*\Sigma_{p_k\in I}i\text{cost}(*,p_k),$$

in which D includes proposition in $C_i$ but not in P, and I includes propositions in P but not in $C_i$.

The invention starts with the initial UB calculation using the three greedy algorithms and finds a sentence boundary solution that minimizes the expected difference between the sentences resulting from these boundary decisions and the examples in the corpus. The expected differences are measured based on an overall cost function. They are defined as: sentence boundary cost, insertion cost, and deletion cost. These costs are then evaluated through an expression to obtain the total cost associated with the proposed solution. Although these cost relationships are used throughout the sentence boundary determination method, they are defined here for clarity.

Sentence boundary cost (SBC): Assuming P is a set of propositions to be conveyed and S is a collection of example sentences selected from the corpus to convey P. Then P can be realized by S with a sentence boundary cost that is equal to (|S|−1)*SBC in which |S| is the number of sentences and SBC is the sentence boundary cost. To use a specific example from the real-estate domain, the input P has three propositions:

$p_1$. House 1 has-attr (style=colonial).

$p_2$. House 1 has-attr(bedroom=3).

$p_3$. House 1 has-attr(bathroom=2).

One solution, S, contains 2 sentences:

$s_1$. This is a 3 bedroom, 2 bathroom house.

$s_2$. This is a colonial house.

Since only one sentence boundary is involved, S is a solution containing one boundary cost. In the above example, even though both $s_1$ and $s_2$ are grammatical sentences, the transition from $s_1$ to $s_2$ is not quite smooth. They sound choppy and disjointed. To penalize this, whenever there is a sentence break, there is a SBC. In general, the SBC is a parameter that is sensitive to a generation system's capability such as its competence in reference expression generation. If a generation system does not have a robust approach for tracking the focus across sentences, it is likely to be weak in referring expression generation and adding sentence boundaries are likely to cause fluency problems. In contrast, if a generation system is very capable in maintaining the coherence between sentences, the proper sentence boundary cost would be lower.

Insertion cost: Assume P is the set of propositions to be conveyed, and $C_i$ is an instance in the corpus that can be used to realize P by inserting a missing proposition $p_j$ to $C_i$, then P can be realized using $C_i$ with an insertion cost of $icost(C_H, p_j)$, in which $C_H$ is the host sentence in the corpus containing proposition $p_j$. Using the example from the real-estate domain, assume the input $P=(p_2, p_3, p_4)$, where proposition $p_4$. House 1 has-attr (square footage=2000).

Assume $C_i$ is a sentence selected from the corpus to realize P: "This is 3 bedroom 2 bathroom house". Since $C_i$ does not contain $p_4$, $p_4$ needs to be added. P can be realized using $C_i$ by inserting a proposition $p_4$ with an insertion cost of $icost(C_H, p_4)$, in which $C_H$ is a sentence in the corpus such as "This is a house with 2000 square feet."

The insertion cost is influenced by two main factors: the syntactic and lexical insertability of the proposition $p_j$ and a system's capability in aggregating propositions. For example, if in the corpus, the proposition $p_j$ is always realized as an independent sentence and never as a modifier, $icost(*, p_j)$ should be extremely high, which effectively prohibit $p_j$ from becoming a part of another sentence. $icost(*, p_j)$ is defined as the minimum insertion cost among all the $icost(C_H, p_j)$. Currently $icost(C_H, p_j)$ is computed dynamically based on properties of corpus instances. In addition, since whether a proposition is insertable depends on how capable an aggregation module can combine propositions correctly into a sentence, the insertion cost should be assigned high or low accordingly.

Expressed mathematically, the insertion cost is computed as:

$$Cost_i(E) = W_i^* \Sigma_{p_j \in E} icost(*, p_j).$$

Deletion cost: Assume P is a set of input propositions to be conveyed and $C_i$ is an instance in the corpus that can be used to convey P by deleting an unneeded proposition $p_j$ in $C_i$. Then P can be realized using $C_i$ with a deletion cost $dcost(C_i, p_j)$. As a specific example, assuming the input is $P=(p_2,p_3,p_4)$, $C_i$ is an instance in the corpus "This is a 3 bedroom, 2 bathroom, 2000 square foot colonial house." In addition to the propositions $p_2$, $p_3$ and $p_4$, $C_i$ also conveys a proposition $p_1$. Since $p_1$ is not needed when conveying P, P can be realized using $C_i$ by deleting proposition $p_1$ with a deletion cost of $dcost(C_i, p_1)$. The deletion cost is affected by the syntactic relation between $p_j$ and its host sentence. Given a new instance $C_i$. "This 2000 square foot 3 bedroom, 2 bathroom house is a colonial", deleting $p_1$, the main object of the verb, will make the rest of the sentence incomplete. As a result, $dcost(C_i, p_1)$ is very expensive. In contrast, $dcost(C_i, p_4)$ is low because the resulting sentence is still grammatically sound. Currently $dcost(C_i, p_j)$ is computed dynamically based on properties of corpus instances. Another factor affecting deletion cost is the expected performance of a generation system. Depending on the sophistication of the generator to handle various deletion situations, the expected deletion cost can be high if the method employed is naive and error prone, or is low if the system can handle most cases accurately.

Expressed mathematically, the deletion cost is computed as:

$$Cost_d(P) = W_d^* \Sigma_{p_j \in D} dcost(C_i, p_j).$$

Overall cost: Assume P is the set of propositions to be conveyed and C is the set of instances in the corpus that are chosen to realize P by applying a set of insertion, deletion and sentence breaking operations, the overall cost of the solution:

$$Cost(P) = \Sigma_{C_i}(W_i^* \Sigma_j icost(C_{Hj}, p_j) + W_d^* \Sigma_k dcost(C_i, p_k)) + (N_b - 1)^* SBC$$

in which $W_i$, $W_d$ and SBC are the insertion weight, deletion weight and sentence boundary cost; $N_b$ is the number of sentences in the solution, $C_i$ is a corpus instance selected to construct the solution and $C_{Hj}$ is the host sentence that proposition $p_j$ belongs.

Expressed another way, the overall cost is computed as:

$$Cost(P) = Cost_d(C_i, D) + Cost_i(E) + SBC + Cost(Q)$$

where P is a set of propositions to be conveyed, $C_i$ is one of the instances within the corpus identified to convey P, D is a set of propositions to be deleted from $C_i$, I is a set of propositions to be added, E is a subset of I be inserted in $C_i$, Q is the rest of propositions in I that will be realized in one or more different sentences (Q=I−E), and SBC is a sentence boundary cost of a natural language generator (NLG).

Detailed Algorithm:

Step 201: set the initial upper bound UB to the lowest cost of solutions derived by the greedy algorithms we described earlier.

Loop A: For each instance $C_i$ in corpus C in which at least one of the propositions in P occurs [O=($C_i \cap P$)≠Ø], creating a search branch. The goal here is to identify all the useful corpus sentence examples for realizing P.

Step 202, for each search branch constructed using $C_i$, delete all the propositions from $C_i$ that are not part of the original P. That is, deleting $p_j \in D$ in which D=$C_i$−P (D contains propositions in $C_i$ that do not exist in P).

Step 203: computing the deletion operators and their associated costs using the relationship:

$$Cost_d(P) = W_d^* \Sigma_{p_j \in D} dcost(C_i, p_j),$$

updating the overall cost.

In step 204, identifying all possible ways of adding propositions in P but do not exist in $C_i$. That is, let I=P−$C_i$ (I contains propositions in P but not in $C_i$).

Loop B: for each subset $E_j \subseteq I$ ($E_j$ includes Ø and I itself), generating a solution by the following steps:

Step 205: inserting propositions in $E_j$ into the existing instance $C_i$ and separating the rest and realizing them as independent sentence(s).

In step 206, updating the overall cost to:

$$Cost(P) = Cost_d(P) + W_i^* \Sigma_{p_k \in E_j} icost(*, p_k).$$

In condition 1: check to see if the lower bound (LB) of the current solution (or partial solution) is higher than established UB.

If the answer is Yes, in step 207, prune the branch and stop the search

If the answer is No, in step 208, continue exploring the branch by recursively computing sbd(Q), where $Q=I-E_j$ and updating the overall cost to: Cost(P)=Cost(P)+SBC+Cost(Q) in which Cost(Q) is the cost of sbd(Q) which recursively computes the best solution for input Q where $Q \subset P$. Recursively computing the best solution realizes the rest of one or more of a plurality of desired propositions in separate sentences uses a cost of: $Cost_s(Q)=SBC+Cost(Q)$, where $C_i$ is the corpus instance selected, Q is a set of propositions to be realized in different sentences, SBC is the sentence boundary cost, and Cost(Q) is the cost associated with the best solution for realizing the set of propositions in Q.

In step 209, update UB if Cost(P) is lower than established UB.

Repeat the process until all the search branches are either visited or pruned.

In step 210, output the solution with the lowest overall cost.

In this preferred embodiment, UB is updated only after a complete solution is found. It is possible to derive better UB by establishing the upper bound for each partial solution dynamically, but the computational overhead might not justify doing so.

While the invention has been described in terms of its preferred embodiment, those skilled in the art will recognize that the invention can be practiced with modification within the spirit and scope of the appended claims.

We claim as new and desire to secure by Letters Patent is as follows:

1. A computer-implemented optimization method for instance-based sentence boundary determination comprising the steps of:
    setting by a computer an initial upper bound (UB) of a cost associated with an optimized solution to a lowest cost derived by several greedy algorithms;
    identifying by the computer all corpus instances stored in an electronic database that contains one or more of a plurality of desired propositions;
    forming by the computer a search tree structure with branches for each of plurality of identified corpus instances that contain one or more of said plurality of desired propositions;
    deleting by the computer one or more of a plurality of undesired propositions from said identified corpus instances;
    updating by the computer an overall cost with one or more deletion costs;
    inserting by the computer one or more of said plurality of desired propositions that were not contained in said corpus instance into said corpus instance;
    updating by the computer the overall cost with one or more insertion costs;
    calculating by the computer a lower bound (LB) of a cost associated with a current solution or partial solution;
    pruning by the computer a current search branch if the LB is greater than the UB;
    recursively computing by the computer a best solution associated with generating one or more additional sentences to convey the rest of said plurality of desired propositions that were not contained in said corpus instance;
    updating by the computer the overall cost with a boundary cost plus a cost associated with the best solution found by the recursively computing procedure;
    updating by the computer UB if the current overall cost is lower than UB; and
    outputting by the computer a solution that has the lowest overall cost using a set of said identified corpus instances with a set of said deletion, insertion and sentence break operations.

2. The method of claim 1 wherein said step of setting the initial UB is preformed using computing resources which consider insertion costs, deletion costs, and sentence boundary costs, and sets an UB for the overall cost of the expected best solution using a greedy set partition algorithm.

3. The method of claim 1, wherein said step of setting the initial UB is performed using computing resources which consider insertion costs, deletion costs, and sentence boundary costs, and sets an UB for the overall cost of the expected best solution using a greedy minimum set covering algorithm.

4. The method of claim 1 wherein said step of setting the initial UB is performed using computing resources insertion costs, deletion costs, and sentence boundary costs, and sets an UB for the overall cost of the expected best solution using one maximum overlapping sentence algorithm.

5. The method of claim 1 wherein said step of deleting one or more of a plurality of undesired propositions from said identified corpus is performed using a deletion cost of:

$$Cost_d(P)=W_d * \Sigma_{p_j \in D} dcost(C_i, p_j)$$

wherein, a set of variables of said set of relationship includes:
    P is a set of propositions to be conveyed,
    D is a set of propositions to be deleted from $C_i$,
    $C_i$ is a single instance within the corpus,
    dcost is a deletion cost,
    $W_d$ is a deletion weight, and
    $p_j$ is a proposition in D.

6. The method of claim 1 wherein said step of inserting one or more of a plurality of desired propositions into said identified corpus is performed using an insertion cost of:

$$Cost_i(E)=W_i * \Sigma_{p_j \in E} icost(*, p_j)$$

wherein, a set of variables of said set of relationship includes:
    $C_1$ is the corpus instance selected,
    E is a set of propositions to be inserted into $C_i$,
    icost is an insertion cost,
    $W_i$ is an insertion weight, and
    $p_i$ is a proposition in E.

7. The method of claim 1 wherein said step of recursively computing the best solution realizes the rest of one or more of a plurality of desired propositions in separate sentences uses a cost of:

$$Cost_s(Q)=SBC+Cost(Q)$$

wherein, a set of variables of said set of relationship includes:
    $C_i$ is the corpus instance selected,
    Q is a set of propositions to be realized in different sentences,
    SBC is the sentence boundary cost, and
    Cost(Q) is the cost associated with the best solution for realizing the set of propositions in Q.

8. The method of claim 1 further comprising the step of re-calculating said insertion costs, said deletion costs and said sentence boundary costs with a overall cost of $$Cost(P)=Cost_d(C_i,D)+Cost_i(E)+SBC+Cost(Q)$$

wherein, a set of variables of said set of relationship includes:
    P is a set of propositions to be conveyed,
    $C_i$ is one of the instances within the corpus identified to convey P,
    D is a set of propositions to be deleted from $C_i$,
    I is a set of propositions to be added,
    E is a subset of I to be inserted in $C_i$, Q is the rest of propositions in I that will be realized in one or more different sentences (Q=I−E), and SBC is a sentence boundary cost of a natural language generator (NLG).

9. A computer readable non-transitory medium having computer readable program code embodied therein for processing an optimization method for instance based sentence boundary determination, the computer readable program code comprising:

process for setting an initial upper bound (UB) of a cost associated with an optimized solution to the lowest cost derived by several greedy algorithms;

process for identifying all corpus instances stored in electronic database that contain one or more of a plurality of desired propositions; forming a search tree structure with branches for each of plurality of identified corpus instances that contain one or more of said plurality of desired propositions;

process for deleting one or more of a plurality of undesired propositions from said identified corpus instances;

process for updating the overall cost with one or more deletion cost;

process for inserting one or more of said plurality of desired propositions that were not contained in said corpus instance into said corpus instance;

process for updating the overall cost with one or more insertion cost;

process for calculating the lower bound (LB) of the cost associated with the current solution (or partial solution);

process for pruning the current search branch if the LB is greater than the established UB;

process for recursively computing the best solution associated with generating one or more additional sentences to convey the rest of said plurality of desired propositions that were not contained in said corpus instance; updating the overall cost with a boundary cost plus the cost associated with the best solution found by the recursive procedure;

process for updating UB if the current overall cost is lower than UB;

process for outputting a solution that has the lowest overall cost using a set of said identified corpus instances with a set of said deletion, insertion and sentence break operations.

10. The computer readable non-transitory medium of claim 9 wherein said process for setting an initial UP uses computing resources and considers insertion costs, deletion costs, and sentence boundary costs, and includes a process for setting an upper bound for the overall cost of the expected best solution using a greedy set partition algorithm.

11. The computer readable non-transitory medium of claim 9 wherein said process for setting an initial UP uses computing resources insertion costs, deletion costs, and sentence boundary costs, and includes a process for setting an upper bound for the overall cost of the expected best solution using a greedy minimum set covering algorithm.

12. The computer readable non-transitory medium of claim 9 wherein said process for setting uses computing resources and includes insertion costs, deletion costs, and sentence boundary costs, and includes a process for setting an upper bound for the overall cost of the expected best solution using a maximum one overlapping sentence algorithm.

13. The computer readable non-transitory medium of claim 9 wherein said process for deleting one or more of a plurality of undesired propositions from said identified corpus is performed using a deletion, cost of:

$$\text{Cost}_d(P) = W_d * \Sigma_{p_j \in D} d\text{cost}(C_i, p_j)$$

wherein, a set of variables of said set of relationship includes:
P is a set of propositions to be conveyed,
D is a set of propositions to be deleted from $C_i$,
$C_i$ is a single instance within the corpus,
dcost is a deletion cost,
$W_d$ is a deletion weight, and
$p_j$ is a proposition in D.

14. The computer readable non-transitory medium of claim 9 wherein said process for inserting one or more of a plurality of desired propositions into said identified corpus is performed using an insertion cost of:

$$\text{Cost}_i(E) = W_i * \Sigma_{p_j \in E} i\text{cost}(*, p_j)$$

wherein, a set of variables of said set of relationship includes:
$C_i$ is the corpus instance selected,
E is a set of propositions to be inserted into $C_i$,
icost is an insertion cost,
$W_i$ is an insertion weight, and
$p_j$ is a proposition in E.

15. The computer readable non-transitory medium of claim 9 wherein said process for recursively computing realizes the rest of one or more of a plurality of desired propositions in separate sentences and uses a cost of:

$$\text{Cost}_s(Q) = SBC + \text{Cost}(Q)$$

wherein, a set of variables of said set of relationship includes:
$C_i$ is the corpus instance selected,
Q is a set of propositions to be realized in different sentences,
SBC is the sentence boundary cost, and
Cost(Q) is the cost associated with the best solution for realizing the set of propositions in Q.

16. The computer readable non-transitory medium of claim 9 further comprising a process for re-calculating recalculates said insertion costs, said deletion costs and said sentence boundary costs with a overall cost of $$\text{Cost}(P) = \text{Cost}_d(C_i, D) + \text{Cost}_i(E) + SBC + \text{Cost}(Q)$$

wherein, a set of variables of said set of relationship includes:
P is a set of propositions to be conveyed,
$C_i$ is one of the instances within the corpus identified to convey P,
D is a set of propositions to be deleted from $C_i$,
I is a set of propositions to be added,
E is a subset of/to be inserted in $C_i$,
Q is the rest of propositions in I that will be realized in one or more different sentences (Q=I−E), and
SBC is a sentence boundary cost of a natural language generator (NLG).

17. A computerized system for optimization of instance-based sentence boundary determination comprising:

data entry and data output devices operationally connected to a computerized domain;

a corpus stored in an electronic database and domain data accessible through a communications link and stored in a storage medium; said computerized domain performing the following setting an initial upper bound (UB) of a cost associated with an optimized solution to the lowest cost derived by several greedy algorithms;

identifying all corpus instances stored in electronic database that contain one or more of a plurality of desired propositions;

forming a search tree structure with branches for each of plurality of identified corpus instances that contain one or more of said plurality of desired propositions;

deleting one or more of a plurality of undesired propositions from said identified corpus instances;

updating the overall cost with one or more deletion cost;

inserting one or more of said plurality of desired propositions that were not contained in said corpus instance into said corpus instance;

updating the overall cost with one or more insertion cost;

calculating the lower bound (LB) of the cost associated with the current solution (or partial solution);

pruning the current search branch if the LB is greater than the established UB;

recursively computing the best solution associated with generating one or more additional sentences to convey the rest of said plurality of desired propositions that were not contained in said corpus instance; updating the overall cost with a boundary cost plus the cost associated with the best solution found by the recursive procedure;

updating UB if the current overall cost is lower than UB;

outputting a solution that has the lowest overall cost using a set of said identified corpus instances with a set of said deletion, insertion and sentence break operations.

* * * * *